US009593824B2

(12) United States Patent
Niu et al.

(10) Patent No.: US 9,593,824 B2
(45) Date of Patent: Mar. 14, 2017

(54) DISPLAY DEVICE AND DISPLAY SYSTEM COMBINED THEREOF

(71) Applicant: AU Optronics Corporation, Hsin-Chu (TW)

(72) Inventors: Tzu-Ling Niu, Hsin-Chu (TW); Fu-Cheng Fan, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 411 days.

(21) Appl. No.: 13/927,292

(22) Filed: Jun. 26, 2013

(65) Prior Publication Data
US 2013/0343081 A1    Dec. 26, 2013

(51) Int. Cl.
*G02F 1/1335*    (2006.01)
*F21V 5/02*    (2006.01)
(Continued)

(52) U.S. Cl.
CPC .............. *F21V 5/02* (2013.01); *G02B 6/0011* (2013.01); *G02B 6/0038* (2013.01);
(Continued)

(58) Field of Classification Search
CPC .................................................. G02F 1/133504
See application file for complete search history.

(56) References Cited

U.S. PATENT DOCUMENTS

| 6,166,787 A | 12/2000 | Akins et al. |
| 2007/0126329 A1 | 6/2007 | Chuang et al. |

(Continued)

FOREIGN PATENT DOCUMENTS

| CN | 201007769 | 1/2008 |
| JP | 02-010394 | 1/1990 |

(Continued)

OTHER PUBLICATIONS

English translation of abstract of CN 201007769 (published Jan. 16, 2008).

(Continued)

*Primary Examiner* — Wen-Ying P Chen
(74) *Attorney, Agent, or Firm* — McClure, Qualey & Rodack, LLP

(57) ABSTRACT

A display device includes a backlight module, a display panel, and a prism film. The backlight module has a light-emitting surface and generates backlight along an average light-emitting direction that is inclined with respect to the light-emitting surface. The display panel is disposed above the light-emitting surface such that backlight from the backlight module passes through the display panel along the inclined direction. The prism film is disposed on one side of the display panel opposite to the backlight module, wherein the prism film has a plurality of prisms disposed side-by-side on one side of the prism film facing the display panel. An extending direction of the prisms at least partially traverses across the average light-emitting direction. Two sides of each prism are respectively a first surface and a second surface, wherein the first surface and the second surface are asymmetric and projection areas of the first surface and the second surface onto the prism film do not overlap. An angle between the first surface and a normal line to the light-emitting surface is greater than an angle between the second surface and the normal line to the light-emitting surface.

19 Claims, 17 Drawing Sheets

(51) Int. Cl.
*F21V 8/00* (2006.01)
*G02F 1/1333* (2006.01)
(52) U.S. Cl.
CPC ........ *G02F 1/1335* (2013.01); *G02F 1/13336* (2013.01); *G02B 6/002* (2013.01); *G02B 6/0073* (2013.01); *G02F 1/133504* (2013.01); *G02F 1/133606* (2013.01); *G02F 1/133615* (2013.01)

(56) References Cited

U.S. PATENT DOCUMENTS

2010/0253591 A1 10/2010 Hwu et al.
2012/0307178 A1 12/2012 Cheng et al.

FOREIGN PATENT DOCUMENTS

| JP | 11-327453 | 11/1999 |
|----|-----------|---------|
| JP | 2005-243259 | 9/2005 |
| TW | 200720774 | 6/2007 |
| TW | 200947080 | 11/2009 |

OTHER PUBLICATIONS

English translation of abstract of JP 11-327453 (published Nov. 26, 1999).
English translation of abstract of JP 02-010394 (published Jan. 16, 1990).
English translation of abstract of JP 2005243259 (published Sep. 8, 2005).
English translation of abstract of JP 200947080 (published Nov. 16, 2009).

DISPLAY DEVICE AND DISPLAY SYSTEM COMBINED THEREOF

BACKGROUND OF THE INVENTION

1. Field of the Invention

The present invention generally relates to a display device and a display system combined thereof; particularly, the present invention relates to a display device and a display system combined thereof that can negate the effects of panel borders on the displaying of images.

2. Description of the Related Art

Display devices, such as electronic products related to liquid crystal display devices, are widely used in everyday life. As the demand for display related devices increases along with increased competition between manufacturers, each display device manufacturer has gradually introduced display products with greater viewing dimensions. As such, the viewing dimension of display devices has become a key factor for a display device's competitiveness in a market of related products. In addition, manufacturers of display devices have also begun to combine multiple display devices together to effectively maintain manufacture of present dimensions of display device while also satisfying the need for display systems of larger display dimensions.

However, combining multiple display devices is no easy task. For instance, each individual display device has borders that would affect the image display effect of the display system once the display devices have been combined together. In order to overcome this predicament, each manufacturer has respectively researched and developed new display technology to decrease the effects of the borders. However, their resulting product tends to decrease the image brightness while increasing the amount of required components for the display device, which subsequently results in an increase in overall thickness of the display device. As shown in FIG. 1 of a conventional display device 50, the display device 50 includes at least two prisms or lens elements, wherein one is a bottom concave lens film 20 and the other is a top convex lens film 40. In the conventional display device, light generated from the backlight module 10 will be dispersed upwards by the bottom concave lens film 20. The dispersed light, after passing through the display panel 30, will expand the range of the image display. As shown in FIG. 1, this expansion may allow the light passing through the display panel 30 to transmit to the top convex lens film 40, wherein the top convex lens film 40 redirects the light upwards so that the display image may be expanded to the prism area 45 above the panel border b of the display panel 50. In this manner, the effects of the panel frame border on the displayed image may be narrowed. However, the above mentioned conventional display device would need to use two lens films, adding to the overall thickness of the display device while also decreasing the image brightness. In addition, in terms of usage, since there are size limitations in the manufacturing of lens films, the above design would primarily only be utilized on devices with small dimensions, such as handheld display devices. That is, it would not be applicable to laptop computers or televisions sets.

SUMMARY OF THE INVENTION

It is an object of the present invention to provide a display device that can decrease the effects of the device's border on the image display.

It is another object of the present invention to provide a display device that will not decrease image brightness when the displayed image shifts or expands.

It is another object of the present invention to provide a display device that can shift or expand images without increasing the thickness of the display device.

It is yet another object of the present invention to provide a display system combined from the above display devices that can decrease the effect of the combined border frames on the image display.

The display device includes a backlight module, a display panel, and a prism film. The backlight module has a light-emitting surface and generates backlight along an average light-emitting direction that is inclined with respect to the light-emitting surface. The display panel is disposed above the light-emitting surface such that backlight from the backlight module passes through the display panel along the inclined direction. The prism film is disposed on one side of the display panel opposite to the backlight module, wherein the prism film has a plurality of prisms disposed side-by-side on one side of the prism film facing the display panel. An extending direction of the prisms at least partially traverses across the average light-emitting direction. Two sides of each prism are respectively a first surface and a second surface, wherein the first surface and the second surface are asymmetric and projection areas of the first surface and the second surface onto the prism film do not overlap. An angle between the first surface and a normal line to the light-emitting surface is greater than an angle between the second surface and the normal line to the light-emitting surface.

A display system includes two of the above display devices, wherein the two display devices are disposed side-by-side and the vector component on the light-emitting surface of the average light-emitting direction of each respective display device is towards the other display device.

A display system includes four of the above display devices, wherein the display devices are disposed in a 2×2 matrix to form a combined display surface, and the light-entrance corner of each display device is positioned at the four corners of the combined display surface.

DETAILED DESCRIPTION OF THE PREFERRED EMBODIMENT

The present invention provides a display device and display system combined thereof. The display device preferably includes a liquid crystal display device and has a side type backlight module. However, in other different embodiments, the display device may use direct type backlight modules.

Figure 1:
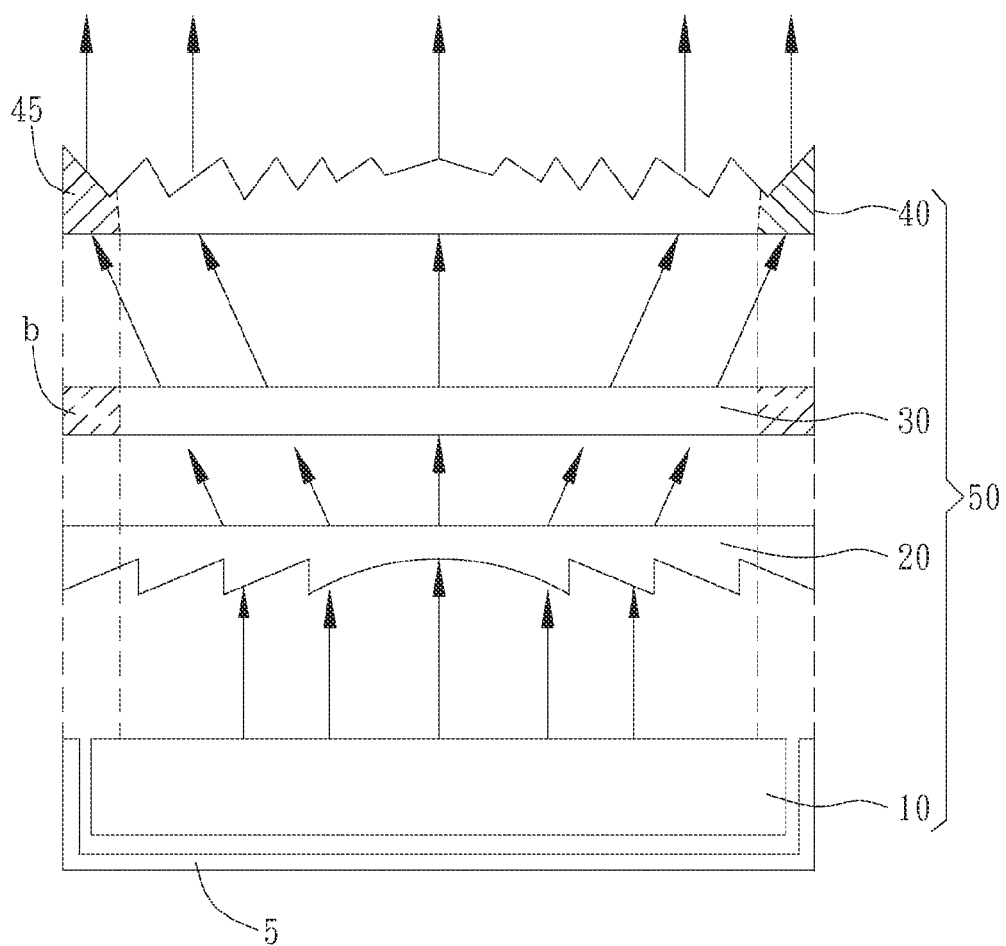
FIG. 1 is a schematic view of the conventional display device.
Figure 2A:
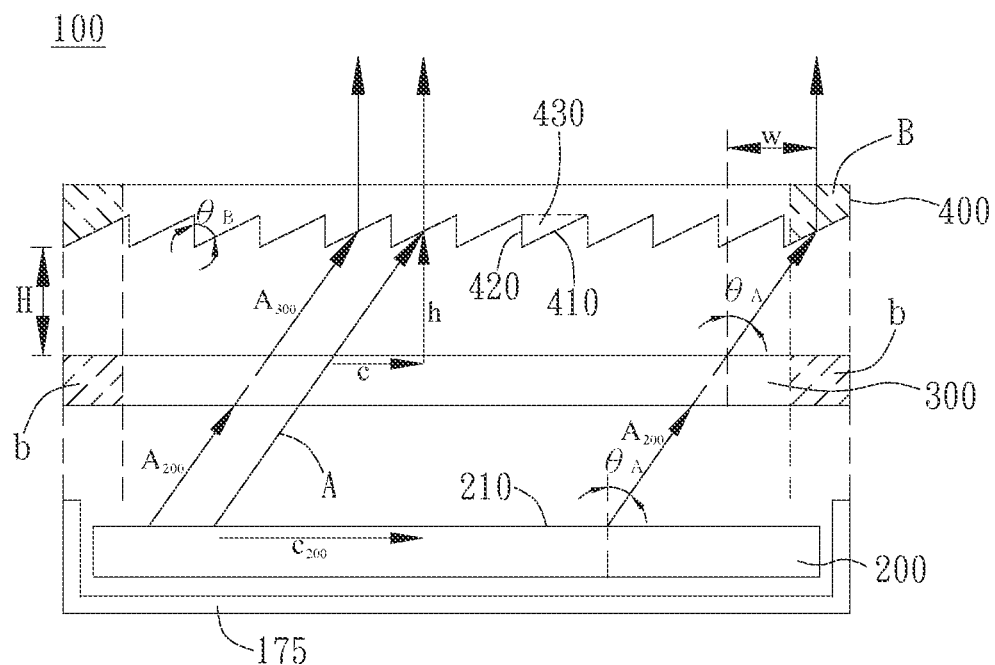
FIG. 2A is a cross-sectional view of an embodiment of the display device of the present invention.

Please refer to FIG. 2A of an embodiment of a display device 100 of the present invention. The display device 100 includes a backlight module 200, a display panel 300, and a prism film 400. The backlight module 200 has a light-emitting surface 210, wherein the light-emitting surface 210 is preferably the top surface of the backlight module 200. In the present embodiment, the display panel 300 is disposed above the light-emitting surface 210, while the prism film 400 is disposed on one side of the display panel 300 opposite to the backlight module 200. In other words, the prism film 400 is disposed above the display panel 300 such that the display panel 300 is sandwiched between the prism film 400 and the backlight module 200. In the present embodiment, the prism film 400 includes a plurality of prisms 430 disposed side-by-side on a surface of the prism film 400 facing the display panel 300. As shown in FIG. 2A, the backlight generated by the backlight module 200 is preferably emitted along an average light-emitting direction that is inclined with respect to the light-emitting surface 210. The average light-emitting direction refers to the average direction of the light generated and emitted by the backlight module 200 out of the light-emitting surface 210. When light from the light-emitting surface of the backlight module 200 reaches the display panel 300, the average direction of the light does not change when passing through the display panel 300. The light will be refracted upwards in the direction L to be parallel to the normal line by the prism film 400 above after passing through display panel 300.

In actuality, the relationship between the above mentioned prism film 400, display panel 300, and backlight module 200 may be expressed in the following equation:

$$w = H \times \tan(\theta_A)$$

Figure 2B:
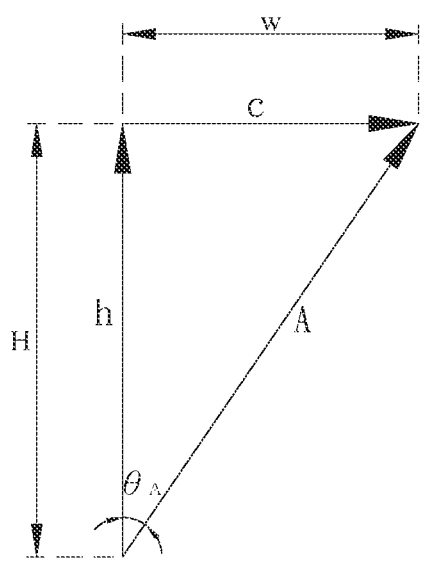
FIG. 2B is a diagram of the average light-emitting direction.

As shown in FIGS. 2A, 2B, and 5, the image shift distance w refers to the distance of image shift of the image generated by the display device 100. Height H refers to the distance between the prism film 400 and the light-emitting surface of the display panel 300. Angle $\theta_A$ is the angle between the average light-emitting direction A and the normal line to the light-emitting surface of the display panel 300 (this angle is also the angle between light emitted out from the light-emitting surface 210 of the backlight module 200 and the normal line to the light-emitting surface 210). Component h is the vector component of the average light-emitting direction A that is parallel to the normal line of the light-emitting surface 210. As shown in FIG. 2B as well as the equation above, any one of the image shift distance w, height H, and angle $\theta_A$ may be adjusted according to design requirements. In more definite terms, backlight emitted in direction of the average light-emitting direction A will reach the prism film 400 after passing through the display panel 300. Since the average light-emitting direction has an angle $\theta_A$ with the normal line to the light-emitting surface 210—and not in the direction of the normal line to the light-emitting surface 210 of the conventional backlight module—the image displayed above the prism film 400 will be shifted towards the outer edges with respect to the original conventional position. Normally, there is usually a panel frame b at the edges of the display panel 300, appearing on the display screen as a black matrix to cover electronic components below. In this circumstance, light generated from conventional backlight modules that travel upwards parallel to the normal line of the light-emitting surface would not be able to reach the prism area B of the prism film 400. As shown in FIG. 2A, the display panel 300 of the present invention also has a panel frame b, wherein there is a prism area B above thereof. In order to overcome the above mentioned problem, in the present embodiment the image shift distance w is preferably equal to or larger than the width of the panel frame b of the display panel 300 such that light from the backlight module 200 may reach the prism area B. That is, with the light generated by the backlight module 200 having an angle $\theta_A$ with respect to the normal line of the light-emitting surface 210, the light is able to be reach the prism area B above the panel frame b after passing through the display panel 300 before being refracted straight upwards by the prism film 400. Through this design, backlight passing through the display panel 300 may reach the prism area B of the prism film 400 and accomplish the effect of borderless image display.

Figure 3A:
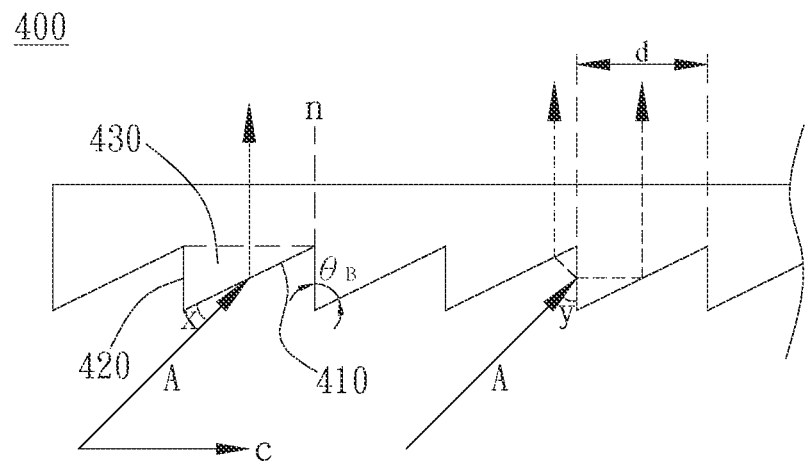
FIG. 3A is an embodiment of the prism film of FIG. 2A.

FIG. 3A is an embodiment of the prism film 400. As shown in FIG. 3A, the prism film 400 has a plurality of prisms 430. In the present embodiment, the plurality of prisms 430 is distributed on the entirety of the bottom surface of the prism film 400. However, in other different embodiments, the plurality of prisms 430 may only be distributed on the bottom surface of the prism film 400 along the edge boundaries. Conversely, conventional optical films such as diffusers or films increasing brightness may be disposed between the backlight module 200 and the display panel 300 in places where the prisms 430 are not disposed. The two sides of each prism 430 are respectively the first surface 410 and the second surface 420. The first surface 410 and the second surface 420 are not symmetrical, and their projections onto the prism film 400 do not overlap. In other words, the first surface 410 and the second surface 420 are either facing away from the prism film 400 or perpendicular to the prism film 400, wherein no one surface will be facing the prism film 400 to form an inner recessed space. In order to decrease crosstalk interference from being generated in the image by the display device 100, the majority of light emitted from the display panel 300 will be refracted up by the first surface 410 of the prisms 430. When light arrives at the first surface 410, the first surface 410 can refract the light from the display panel 300 vertically upwards in a single refraction manner. The second surface 420 will reflect or refract light towards the inner surface of the first surface 410 such that the first surface 410 will reflect or refract the light from the second surface 420 upwards. Therefore, in order to control the light to be reflected or refracted vertically upwards and decrease crosstalk interference, the first surface 410 is preferably not symmetrical to the second surface 420.

As shown in FIG. 3A, the first surface 410 is back facing the vector component $c_{200}$ (or the vector component c on the display panel 300) of the average light-emitting direction A on the light-emitting surface 210, while the second surface 420 faces the vector component $c_{200}$ of the average light-emitting direction A on the light-emitting surface 210. In other words, the second surface 420 is a surface that positively meets the average light-emitting direction A, while the first surface 410 is the surface that does not positively meet the average light-emitting direction A. Although the first surface 410 comparatively is the side that does not more positively meet the average light-emitting direction A, the size of the angle between the first surface 410 and the normal line to the light-emitting surface 210 is still enough to receive backlight of average light-emitting direction A, as shown in FIG. 3A, and then to refract the light parallel to the normal line of the light-emitting surface 210. In other words, the first surface 410 refracts the backlight from the display panel 300 vertically upwards. In the present embodiment, a prism contact angle x between the first surface 410 and the average light-emitting direction A is smaller than a prism contact angle γ between the second surface 420 and the average light-emitting direction A. In practice, the normal line angle $θ_B$ between the first surface 410 of the prism 430 and the light-emitting surface 210 may be calculated from the prism contact angle x according to Snell's Law. Therefore, only the average light-emitting direction A of the backlight generated by the backlight module 200 is needed to be known in order to adjust the shape of the prism 430 so that the backlight may be refracted in the direction straight up (parallel to the normal line of the light-emitting surface 210).

In addition, in the present embodiment as shown in FIGS. 2A and 3A, the second surface 420 is preferably perpendicular to the light-emitting surface 210 to ensure the image clarity of the display device 100 as well as to prevent the problem of generating crosstalk interference. Each prism has a prism width d, wherein prism width d is preferably smaller than 50 μm. However, in other different embodiments, the prism width d may be set as 100 μm according to design requirements. In the present embodiment, the first surface 410 and the second surface 420 of the prism 430 will not block light from passing through. However, in other different embodiments, the second surface may form a light-blocking layer to block light from passing through. The purpose of this is to decrease the effects of the mentioned crosstalk interference.

Figure 3B:
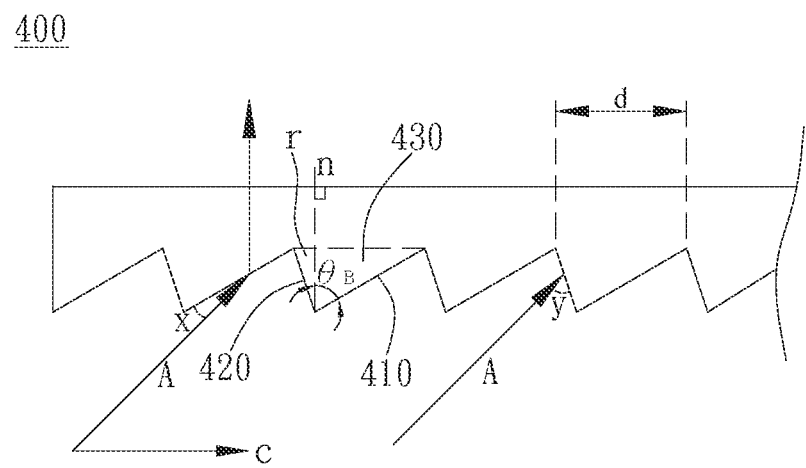
FIG. 3B-3D are other embodiments of FIG. 3A.

FIG. 3B is another embodiment of FIG. 3A. As shown in FIG. 3B, the angle $θ_B$ between the first surface 410 of each prism 430 of the prism film 400 and the normal line to the light-emitting surface 210 is preferably greater than 40 degrees, while the angle r between the second surface 420 and the normal line n to the light-emitting surface 210 may be smaller than 10 degrees. The purpose of disposing the angle r is that when roll-to-roll manufacturing process or injection process is utilized to manufacture the prism film 400, the prism film 400 can be more easily separated from the mold if the mold has a taper angle (draft angle) such that the prism microstructure may be more perfectly transcribed. In this case, angle r is correspondingly generated from the taper angle of the mold. However, if the taper angle is overly large, more backlight from the display panel 300 (first backlight group A1) will be emitted to the second surface 420 and increase crosstalk interference, consequently affecting the quality and clarity of the image produced by the display device 100. Therefore, under the basis of functionality and manufacturing, angle r is preferably smaller than 10 degrees such that crosstalk interference may be suppressed. Through this design, the projections of the first surface 410 and the second surface 420 onto the prism film 400 will still not overlap with the first surface 410 and/or second surface 420 of neighboring prisms. However, in other different embodiments, angle r may be greater than 10 degrees and smaller than 40 degrees, such that slight crosstalk interference may be produced to accomplish the effect of three dimensional image display.

Figure 3C:
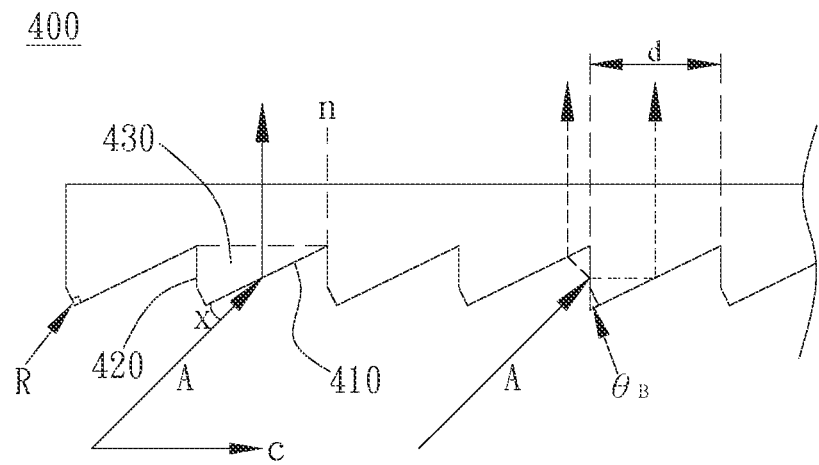

FIG. 3C is another embodiment of FIGS. 3A and 3B. As shown in FIG. 3C, a taper angle R may also be disposed. In the present embodiment, the taper angle R is preferably defined by between the first surface 410 and the normal line to the first surface 410 (in other words, 90 degrees). However, in other different embodiments, taper angle R may be other numerical values. Similar to the advantages provided by the angle r, taper angle R provides convenience during the manufacturing process and within a determined range will not cause crosstalk interference.

Figure 3D:
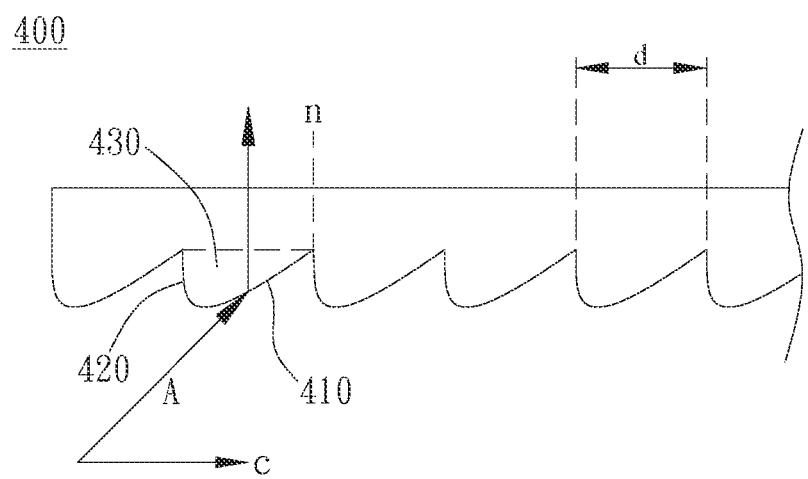

FIG. 3D is another embodiment of FIG. 3A. In the present embodiment, the first surface 410 and the second surface 420 of the prism 430 form an arc or curved surface. The first surface 410 may, within a range according to Snell's Law on light refraction, be curved such that backlight may still be refracted vertically upwards by the first surface 410. This design also allows the same convenience of the taper angle R of FIG. 3C in the manufacturing process. In addition, the curved shape of the prism 430 can decrease bright spot problems resulting that may result from damage to the sharp ends of taper angle R.

Figure 4A:
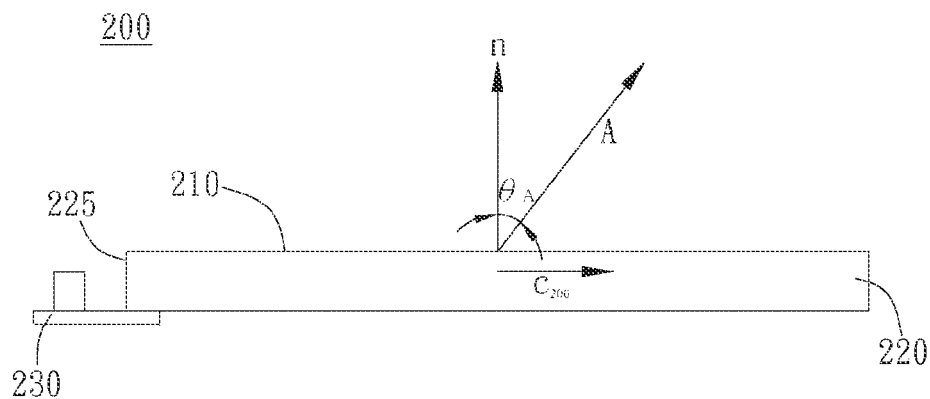
FIGS. 4A-4E are embodiments of the backlight module.

FIG. 4A is a basic conceptual diagram of the backlight module 200 of FIG. 2A. As shown in FIG. 4A, the backlight module 200 at least includes a light guide plate 220 and a light source module 230, wherein the light guide plate 220 has a light-entrance side 225. The light source module 230 is disposed in front of the light-entrance side 225 and generates light that enters the light guide plate 220 through the light-entrance side 225. Simply stated, the embodiment of FIG. 4A utilizes side view backlight modules, wherein vector component $c_{200}$ is the projection of the average light-emitting direction A on the light-emitting surface 210 and is parallel to the vector component c (vector component c is the component on the display panel 300 of the average light-emitting direction A).

Figure 4B:
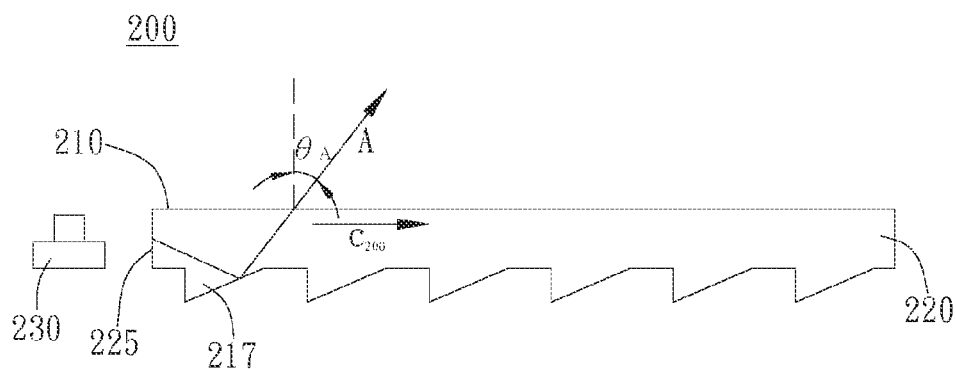
Figure 4C:
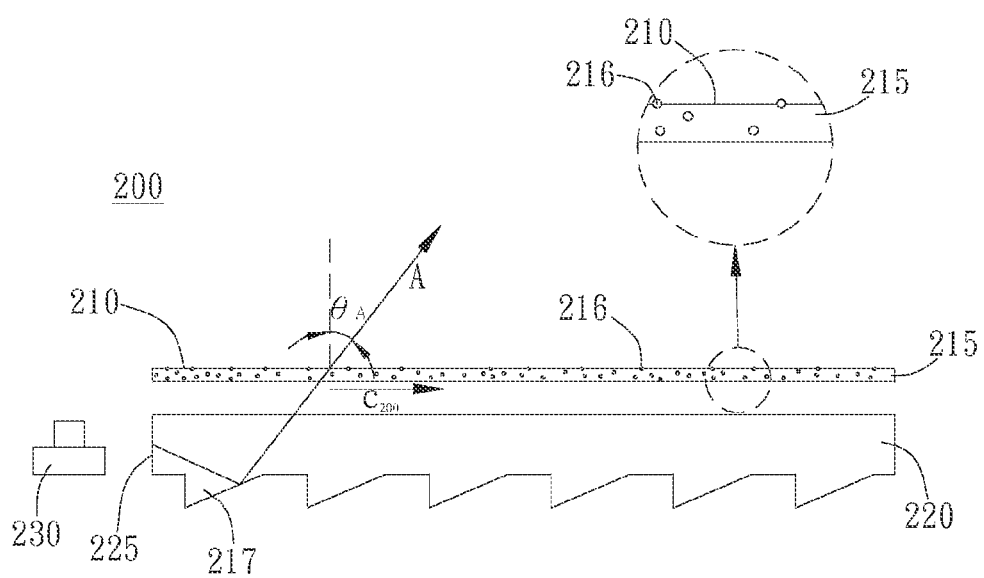
Figure 4D:
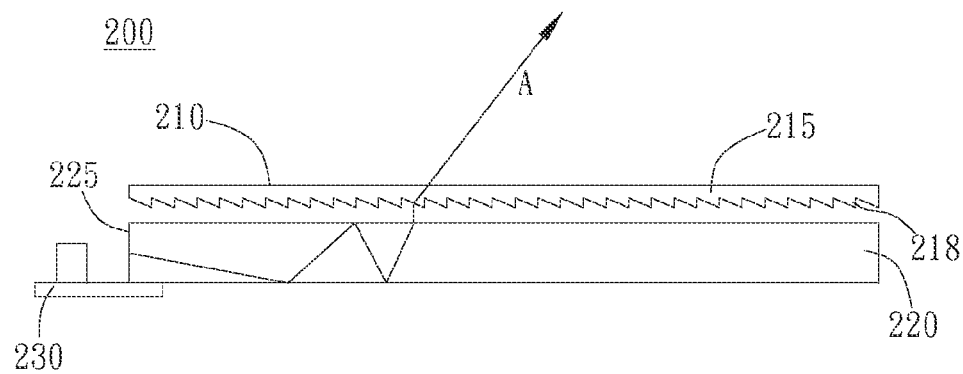

FIGS. 4B and 4D are two different embodiments of the backlight module 200 generating light with average light-emitting direction A. FIG. 4B illustrates how backlight is guided towards the average light-emitting direction A by the light guide plate of the backlight module 200. FIG. 4D, on the other hand, illustrates how a film 215 above the light guide plate 220 guides and refracts backlight towards the average light-emitting direction A.

As shown in FIG. 4B, the backlight module 200 my guide backlight to be emitted out in the average light-emitting direction A through utilizing the plurality of microstructures 217 formed below the light guide plate 220, wherein the distance between each microstructure 217 may be adjusted according to design requirements.

FIG. 4C is another embodiment of FIG. 4B. As shown in FIG. 4C, film 215 may also be disposed above the light guide plate 220. In the present embodiment, the film 215 is a diffuser film, wherein the diffuser film has a plurality of diffusing particles 216. As shown in FIG. 4C, the diffusing particles 216 are evenly distributed within the diffuser film and on the light-emitting surface of the diffuser film (i.e. light-emitting surface 210 of the backlight module 200). However, in other different embodiments, the diffuser particles 216 may be disposed only within the film 215 or on the surface of the light-emitting surface 210. In addition, the dimension, distribution density, and shapes of the diffuser particles 216 may be adjusted according to design requirements. In the present embodiment, backlight from the light guide plate 220 will reach the diffuser film of the film 215 in the direction of the average light-emitting direction A. The backlight will then diffuse and spread in the general direction of the average light-emitting direction A after passing through the plurality of diffuser particles 216 of the diffuser film. The advantage of this design is that the diffuser film of the film 215 can increase the viewing angle of the display device 100 while at the same time can cover the microstructures 117 and/or any other defects of the light guide plate 220.

FIG. 4D is an example of a second embodiment of the backlight module 200 emitting light in a direction of average light-emitting direction A. As shown in FIG. 4D, the backlight emitted by the light guide plate 220 is emitted vertically upwards to the light-emitting surface, the film 215 may be a type of prism film, wherein there is a plurality of microstructures 218 on the surface of the prism film. In the present embodiment, the microstructure 218 is disposed on a surface of the film 215 facing the light guide plate 220. However, in other different embodiments, the microstructure 218 may also be disposed on a surface of the film 215 facing away from the light guide plate 220. When backlight is emitted along the normal line to the light-emitting surface of the light guide plate 220 and reaches the prism film of the film 215, the backlight will guided and refracted by the microstructures 218 of the film 215 to travel in the average light-emitting direction A. The backlight will then maintain this direction upon exiting out the light-emitting surface 210 of the backlight module 200. In other words, in comparison to the embodiments in FIGS. 4B and 4C, the embodiment in FIG. 4D utilizes the microstructures 218 of the film 215 above the light guide plate 220 to refract backlight towards the average light-emitting direction A.

Figure 4E:
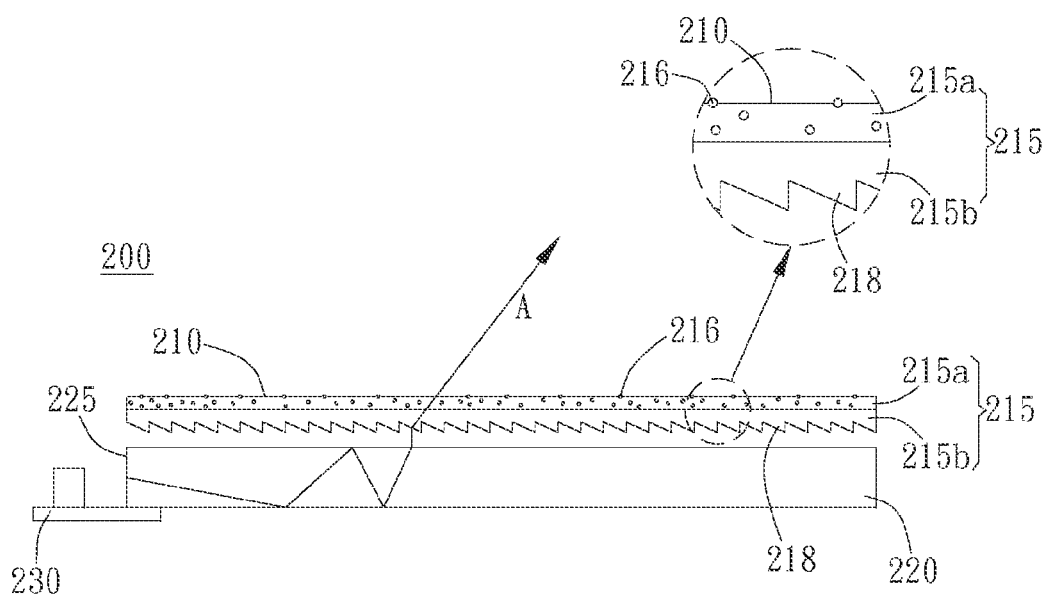

FIG. 4E is another embodiment of FIG. 4D. In the present embodiment, the film 215 is a combined diffuser layer formed from the diffuser film and prism film of FIGS. 4C and 4D. As shown in FIG. 4E, the film 215 includes diffuser film 215a and prism film 215b, wherein the diffuser film 215a is composited on top of the prism film 215b. When the backlight is emitted towards the film 215 in the direction vertically upwards with respect to the light-emitting surface of the light guide plate 220, the backlight will first be refracted towards the average light-emitting direction A by the plurality of microstructures 218 of the prism film 215b before being diffused out of the light-emitting surface 210 through the plurality of diffuser particles 216 of the diffuser film 215a in the general direction of the average light-emitting direction A. Similar to the advantages of the embodiment of FIG. 4C, the combined or composite diffuser layer of the film 215 may increase the viewing angle of the display device 100.

Figure 4F:
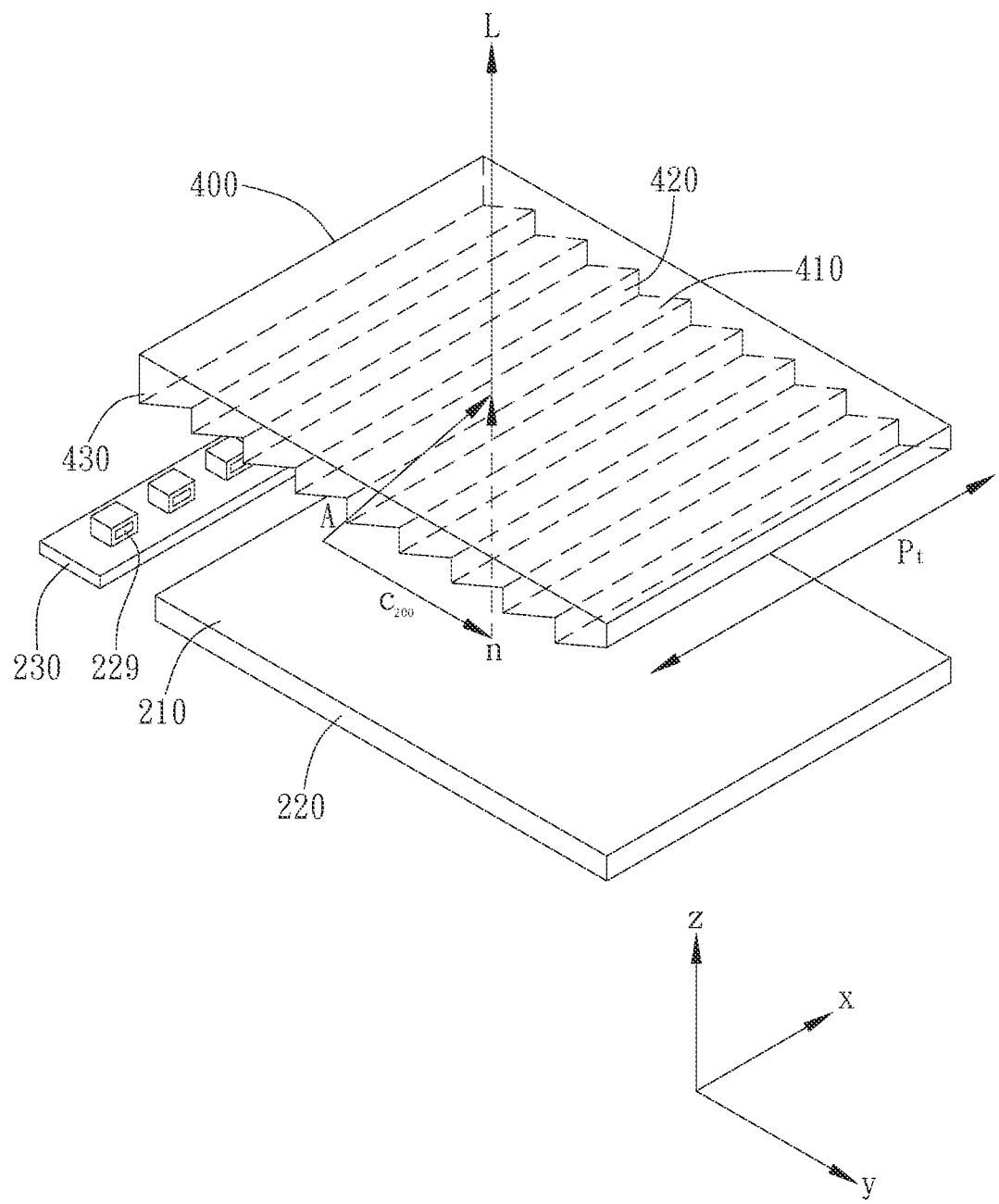
FIG. 4F is an exploded view of the display device.

FIG. 4F is an exploded view of an embodiment of the display device 100. It should be noted that for the convenience showing the relationship between the prism film 400 and the backlight module 200, FIG. 4F has disregarded showing the display panel 300 that should be disposed between the light guide plate 220 and the prism film 400 so that FIG. 7A may be more comprehensible. As shown in FIGS. 4A and 4F, in the present embodiment, a light source module 230 is preferably a type of Light-Emitting Diode (LED) light source module having at least a light-emitting surface 229. Light generated by the light source module 230 is emitted from the light source surface 229 into a light-entrance side 225 of a light guide plate 220. The light guide plate 220 then guides the light out through the light-emitting surface 210 in the direction parallel to average light-emitting direction A. As shown in FIG. 4F, the backlight L is emitted out of the light-emitting surface 210 in the average light-emitting direction A and is then guided by the first surface 410 of one of the prism 430 of the prism film 400 towards the direction parallel to the normal line n.

As shown in FIGS. 2A and 4F, the (prism) extending direction $P_t$ of each prism 430 of the prism film 400 is preferably parallel with the light-emitting surface 229 of the light source module 230. In more definite terms, in the present embodiment, the z-axis is parallel with the normal line n to the light-emitting surface 210, and the plane formed between the z-axis with the extending direction $P_t$ is parallel to the plane of the light-emitting surface 229. In other words, in terms of the projection onto the light-emitting surface 210, the average light-emitting direction A will overlap with the vector component $c_{200}$ (or if in terms of the projection onto the display panel 300, the average light-emitting direction A will overlap with the vector component c), while simultaneously be perpendicular to the prism extending direction $P_t$. In short, the extending direction $P_t$ traverses across the average light-emitting direction A. In the present embodiment, since the prisms 430 are distributed in straight lines and are parallel to the distribution direction of the light source module 230, light having average light-emitting direction at any point on the light-emitting surface 210 will traverse across the prism extending direction $P_t$ (i.e. perpendicular to the extending direction $P_t$). The advantage of this design is that the prism film 400 can evenly distribute the light generated by the light source module 230 vertically upwards to the above image display area, decreasing the circumstances of uneven brightness from occurring.

Figure 5A:
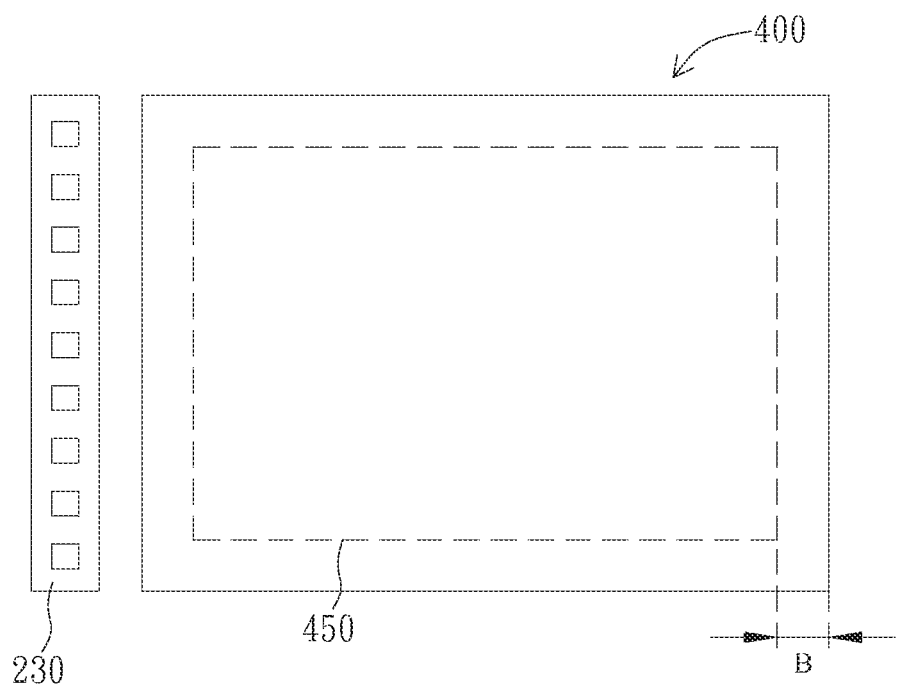
FIG. 5A is a top view of the conventional display area of a display device.
Figure 5B:
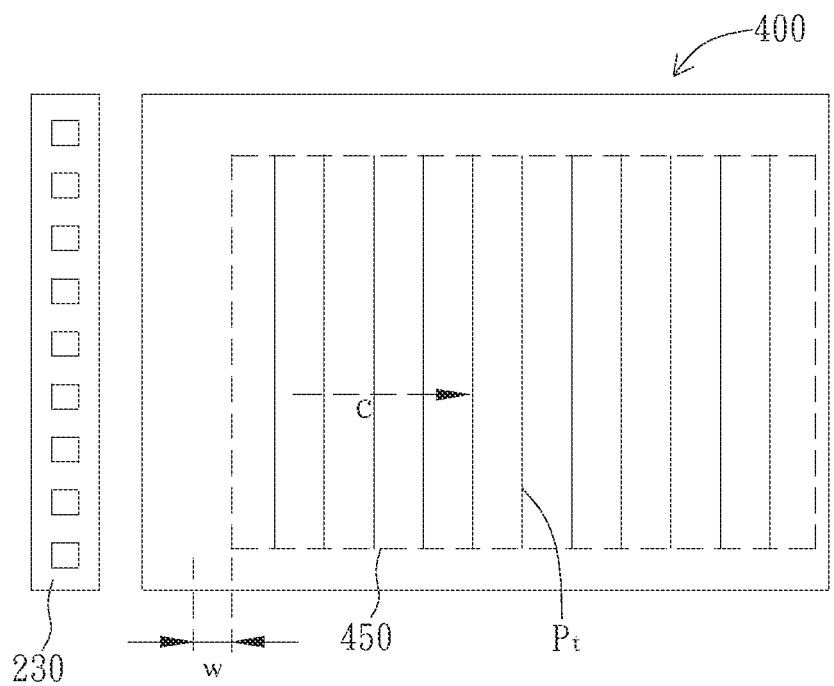
FIG. 5B is a top view of the shift in display area of the display device of the present invention.

FIG. 5A illustrates the border area on the display surface of the display device 100. As shown in FIG. 5A, there is a border area of panel frame b on the outer edges of the display device 100. As shown in FIGS. 2A and 5B, through the cooperation between the backlight module 200 and the prism film 400, the image display area 450 will shift in the direction towards the light source module 230 (i.e. direction of the vector component c). The image display area 450 will move in the direction of the vector component c for a distance of image shift distance w. This will result in a decrease in width of the panel frame b of the corresponding side. As shown in FIG. 5B, the extending direction $P_t$ of the plurality of prisms 430 of the prism film 400 can be clearly seen to be parallel with respect to the light-emitting surface 229 of the light source module 230. At the same time, the projection of the extending direction $P_t$ onto the display panel 300 is also perpendicular to the vector component c.

Figure 5C:
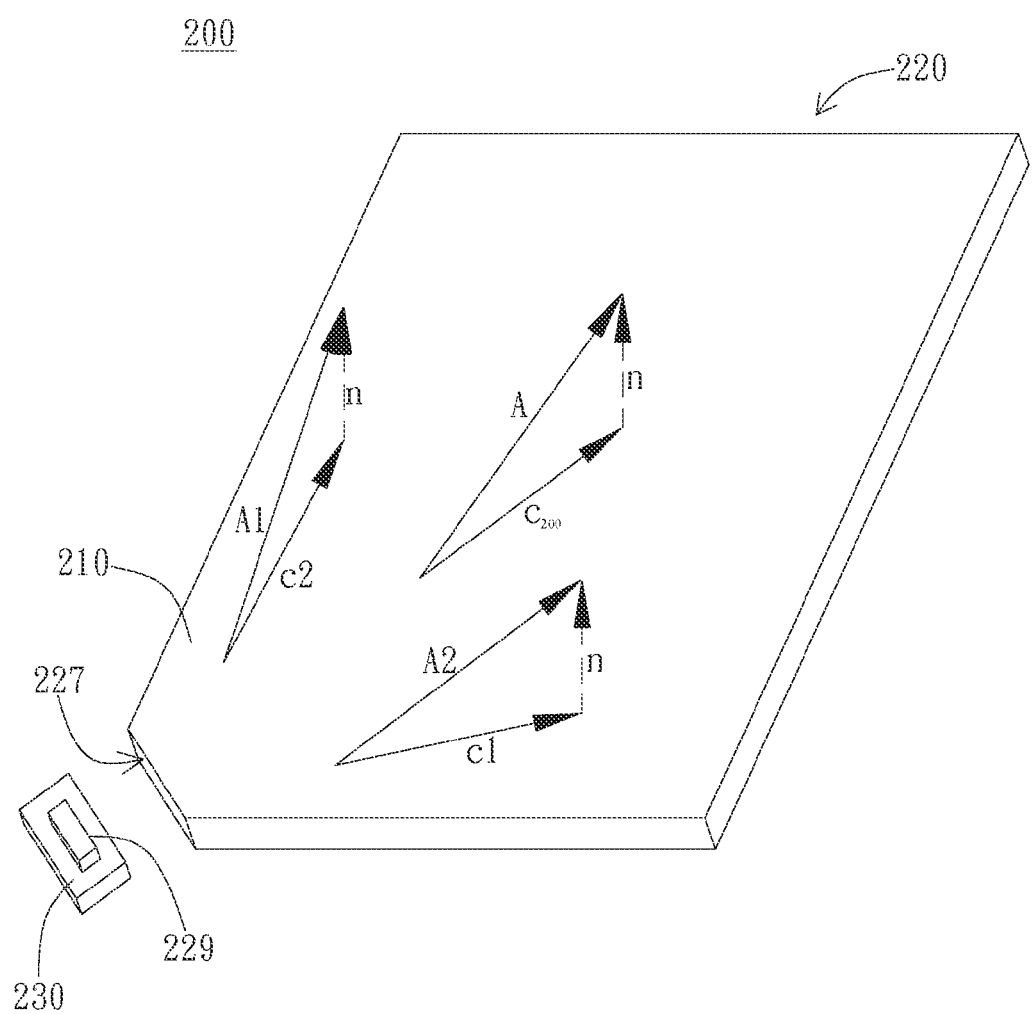
FIGS. 5C and 5D are embodiments of the backlight module.

However, the disposed position of the light source module 230 is not limited to a side of the light guide plate 220. In other different embodiments, the light source module 230 may also be disposed at a corner of the light guide plate 220. FIG. 5C illustrates an embodiment of the light source module 230 being disposed at a corner of the light guide plate 220. As shown in FIG. 5C, a corner of the light guide plate 220 is formed as a light-entrance corner 227, wherein the light source module 230 is disposed in front of the light-entrance corner 227. Simply stated, the embodiment of FIG. 5C is a backlight module utilizing a form of corner light entrance. When light generated from the light source module 230 enters into the light guide plate 220 through the light-entrance corner 227, the light guide plate 220 will emit the light out the light-emitting surface 210 in the direction of the average light-emitting direction A. The vector component $c_{200}$ overlaps with the projection of the average light-emitting direction A onto the light guide plate 220, wherein the vector component $c_{200}$ is parallel with the direction from the light-entrance corner 227 to the diagonal corner opposite to the light-entrance corner 227.

Figure 5D:
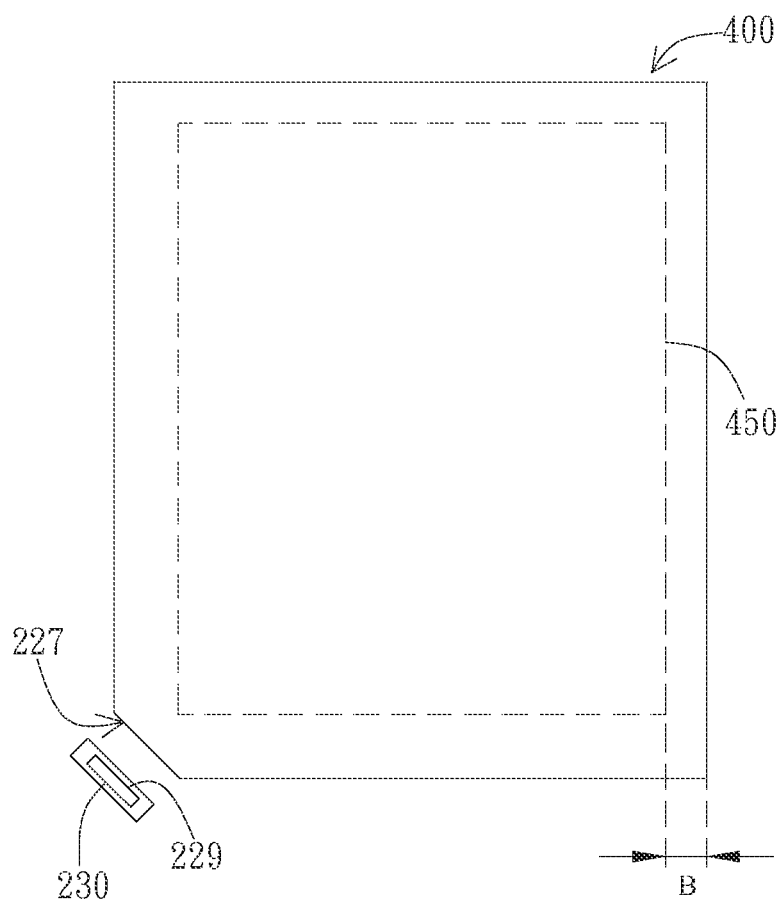
Figure 5E:
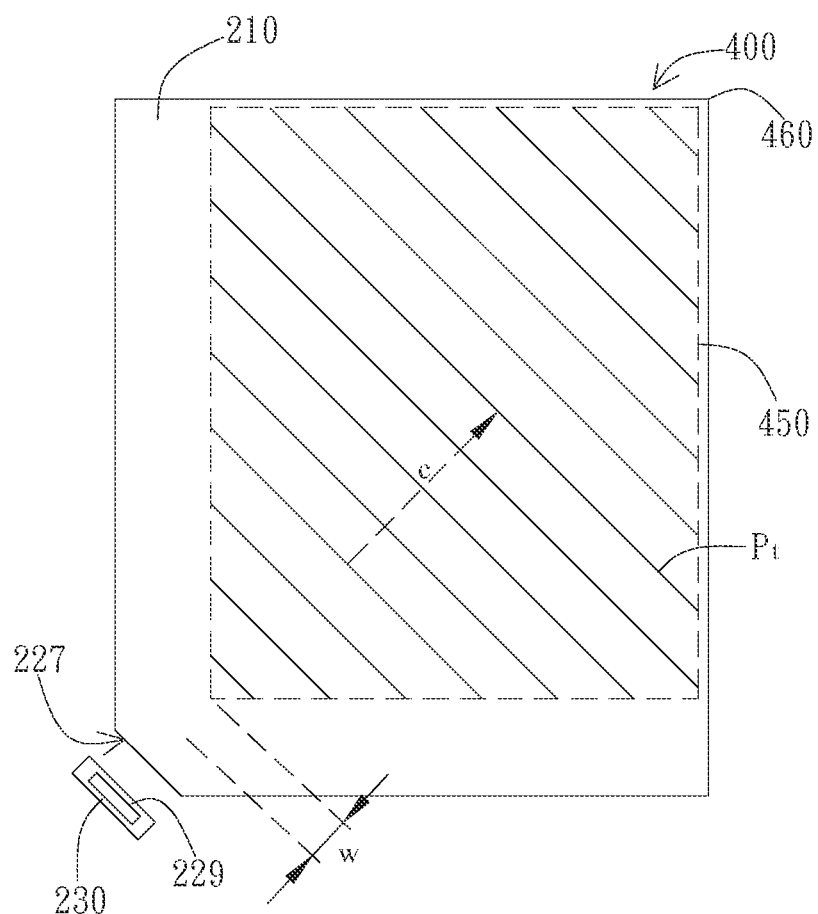
FIG. 5E is a top view of another embodiment of FIG. 5D.

Similar to FIG. 5A, FIG. 5D illustrates a border area of the display device 100. As shown in FIG. 5D, the outer edges of the display surface of the display device 100 has a border area of width b. On the other hand, FIG. 5E illustrates an embodiment having the corner lighting backlight module with the prism film 400. In comparison to the position of the display area 450 of FIG. 5D, the display area 450 of FIG. 5E is formed from backlight emitting out of the light guide plate 220 of FIG. 5C in the average light-emitting direction A being refracted upwards along the normal line to the light-emitting surface 210 by the plurality of prisms 430 (not shown). In this manner, the display area 450 of FIG. 5E is shifted a distance of image shift distance w in the direction of the vector component c of the average light-emitting direction A with respect to the display area 450 of FIG. 5D. In other words, the display position of the image display area 450 moves to the right to allow the display area 450 to be closer to the two sides of the display device 100 corresponding to the corner 460. In the present embodiment, similar to the embodiment of FIG. 5B, the extending direction $P_t$ of the prisms 430 is parallel with the light-emitting surface 229. However, since the light source module 230 is disposed at a corner of the display device 100, the extending direction $P_t$ of the plurality of prisms 430 of the prism film 400 will be distributed parallel to the diagonal line joining the opposite corners.

Figure 5F:
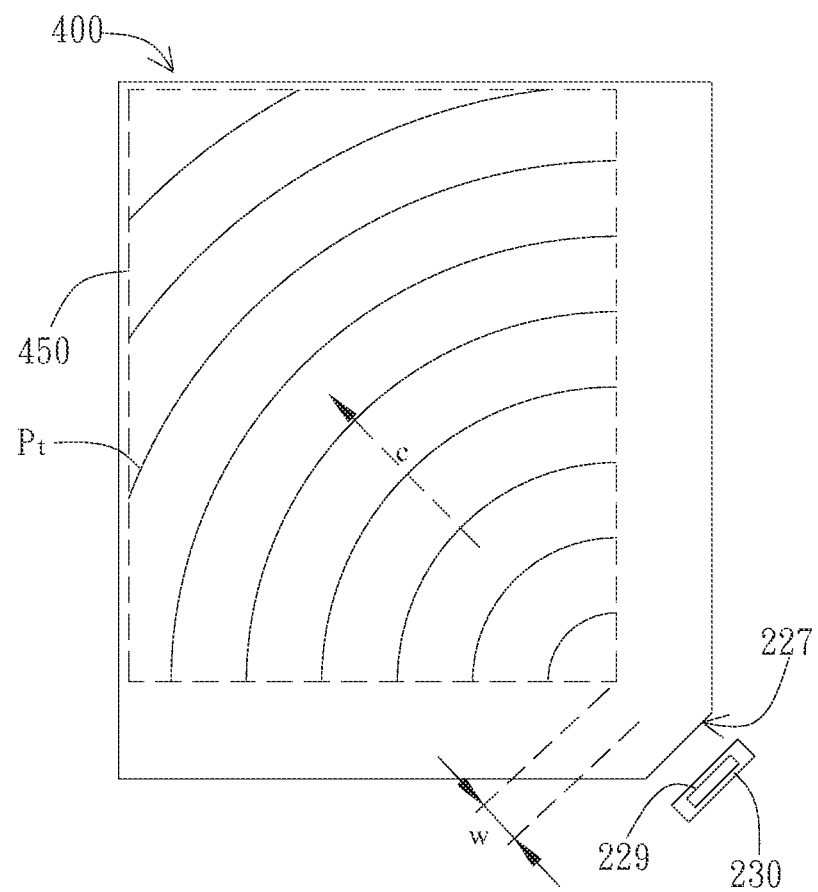
FIG. 5F is another embodiment of FIG. 5E.
Figure 5G:
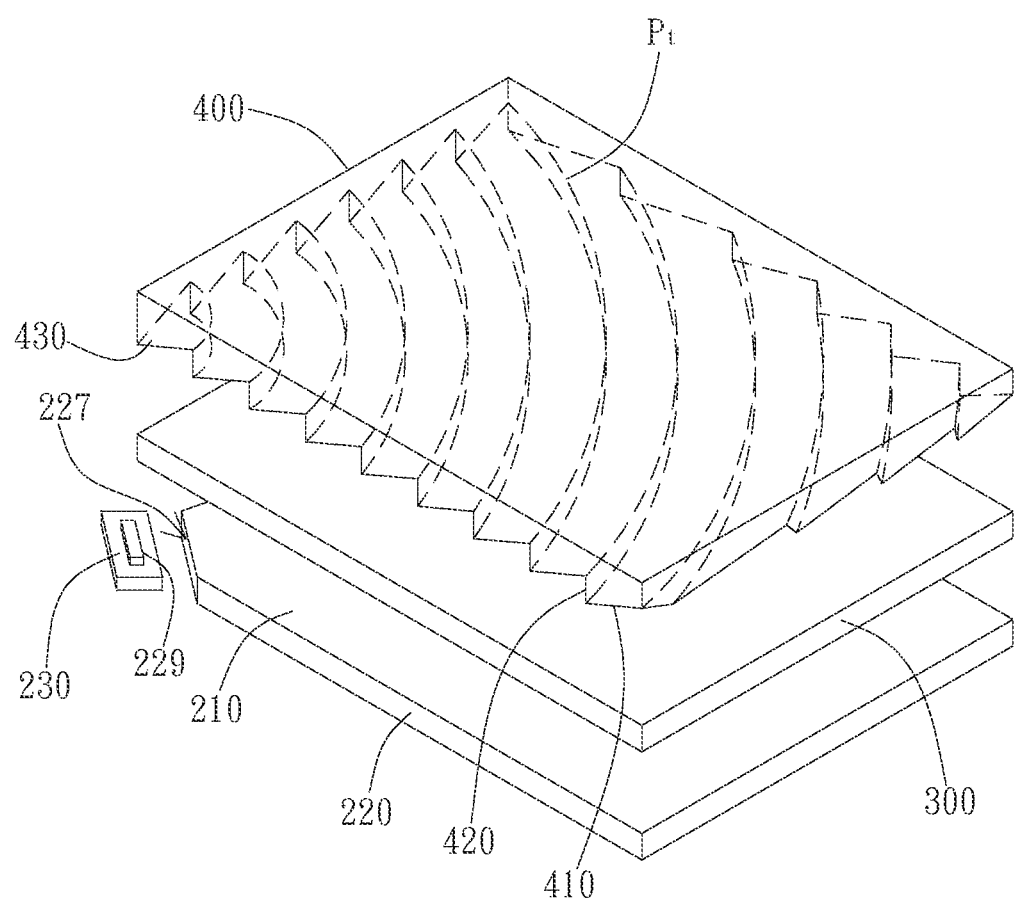
FIG. 5G is another embodiment of FIG. 5F.

FIG. 5F and FIG. 5G are more embodiments. In comparison to FIG. 5E, the extending direction $P_t$ of the prisms of FIGS. 5F and 5G exhibit arc shapes with the light-entrance corner 227 as the center point. As shown in FIGS. 5C and 5E, since backlight generated from the light source module 230 enters the light guide plate 220 through the light-entrance corner 227, a portion of the light will not be emitted out of the light-emitting surface 210 in the direction parallel to the average light-emitting direction A (for example, light directions A1 and A2). In the embodiment of FIG. 5F, the plurality of prisms 430 forming the extending direction $P_t$ with the arc shape can maintain being perpendicular with these portions of light not traveling in the direction parallel to the average light-emitting direction A. In this manner, a majority of light emitted from the light-emitting surface 210 can be refracted straight upwards by the prisms 430 such that the image displayed on the image display area 450 may be more even as a whole.

Figure 6A:
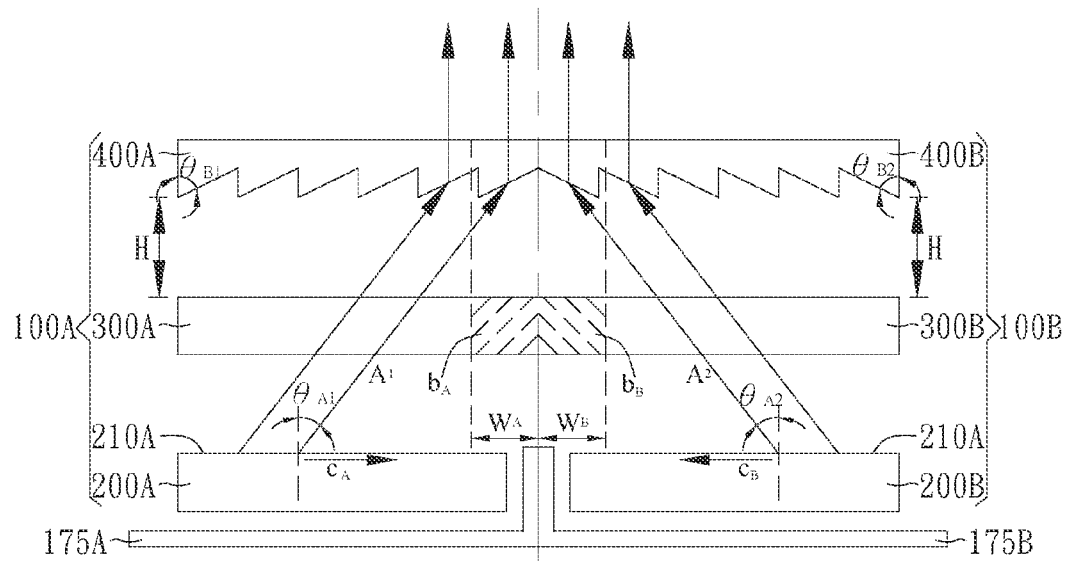
FIGS. 6A and 6B are embodiments of the display system having two display devices.
Figure 6B:
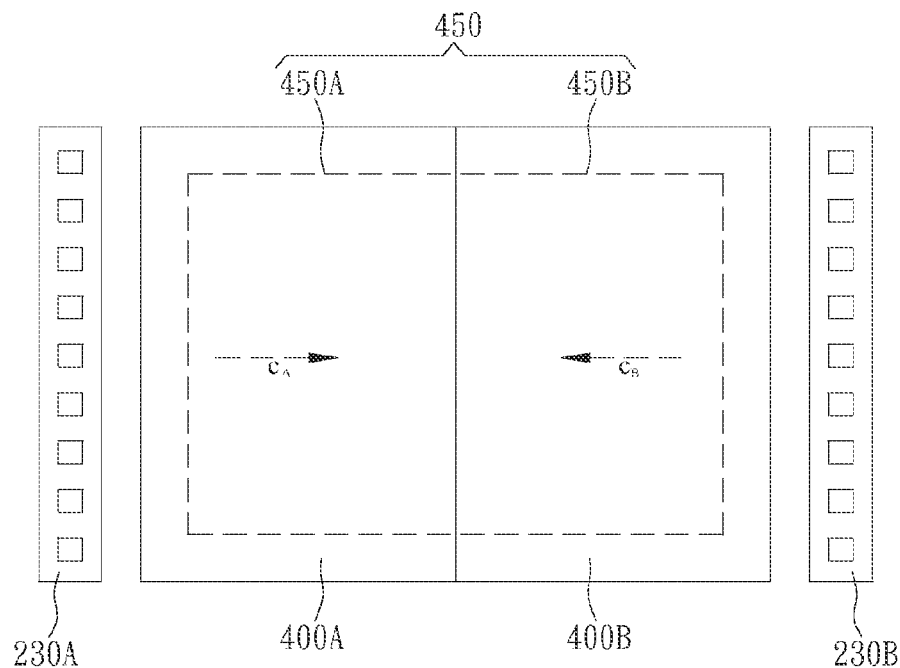

FIG. 6A is an embodiment of the display system 150 of the present invention. As shown in FIG. 6A, the display system 150 includes two display devices (display devices 100A and 100B respectively), wherein the display devices 100A and 100B are disposed side-by-side against each other. The vector components of the average light-emitting directions of each of the display devices are respectively towards each other. In the present embodiment, the light source modules 230 of the backlight module 200A and 200B are preferably arranged at the sides of the display device 100A and 100B that are respectively the opposite sides of the display system 150. In other words, the light source module of the backlight module 200A of the display device 100A in FIG. 6A is disposed at a side of the backlight module 200A that is opposite to the display device 100B (i.e. position of the 210A label). The light source module of the backlight module 200B is similarly disposed at a side on the backlight module 200B that is opposite to the display device 100A (i.e. position of the 210B label). As shown in FIG. 6A, the display devices 100A and 100B respectively have a display panel border width $B_A$ and $B_B$. In order to achieve a borderless image effect between the display devices 100A and 100B, the display device 100A will shift its displayed image in the direction of the display device 100B a distance of image shift distance $W_A$ through coordination between the prism film 400A and the backlight module 200A. Conversely, the display device 100B will similarly shift its image that is displayed above the prism film 400B a distance of image shift distance $W_B$ towards the display device 100A. Through this design, as shown in FIGS. 6A and 6B, the image produced in the image display area 450A and 450B of the display devices 100A and 100B will be concentrated towards the center and effectively mask the display panel frame below, ultimately achieving a borderless image effect between the display devices 100A and 100B.

In the present embodiment, display device 100A is a mirror image of display device 100B. As such, their corresponding angles, widths, and image shift distances are the same. However, in other different embodiments, the display devices 100A and 100B may have different angles, widths, and image shift distances according to design requirements. For instance, if the width of the panel frame $b_A$ of the display panel 300A of the display device 100A (i.e. image shift distance $W_A$) is not the same as the display panel 300B of the display device 100B (i.e. image shift distance $W_B$) and height H unchanged, angle $\theta_{A1}$ of the display device 100A and angle $\theta_{A2}$ of the display device 100B may be changed according to their respective frame widths by following the relationship formula regarding height H, image shift distance w, and angle $\theta_A$ mentioned previously. In this manner, a borderless image effect between the display devices 100A and 100B may be achieved.

Figure 7A:
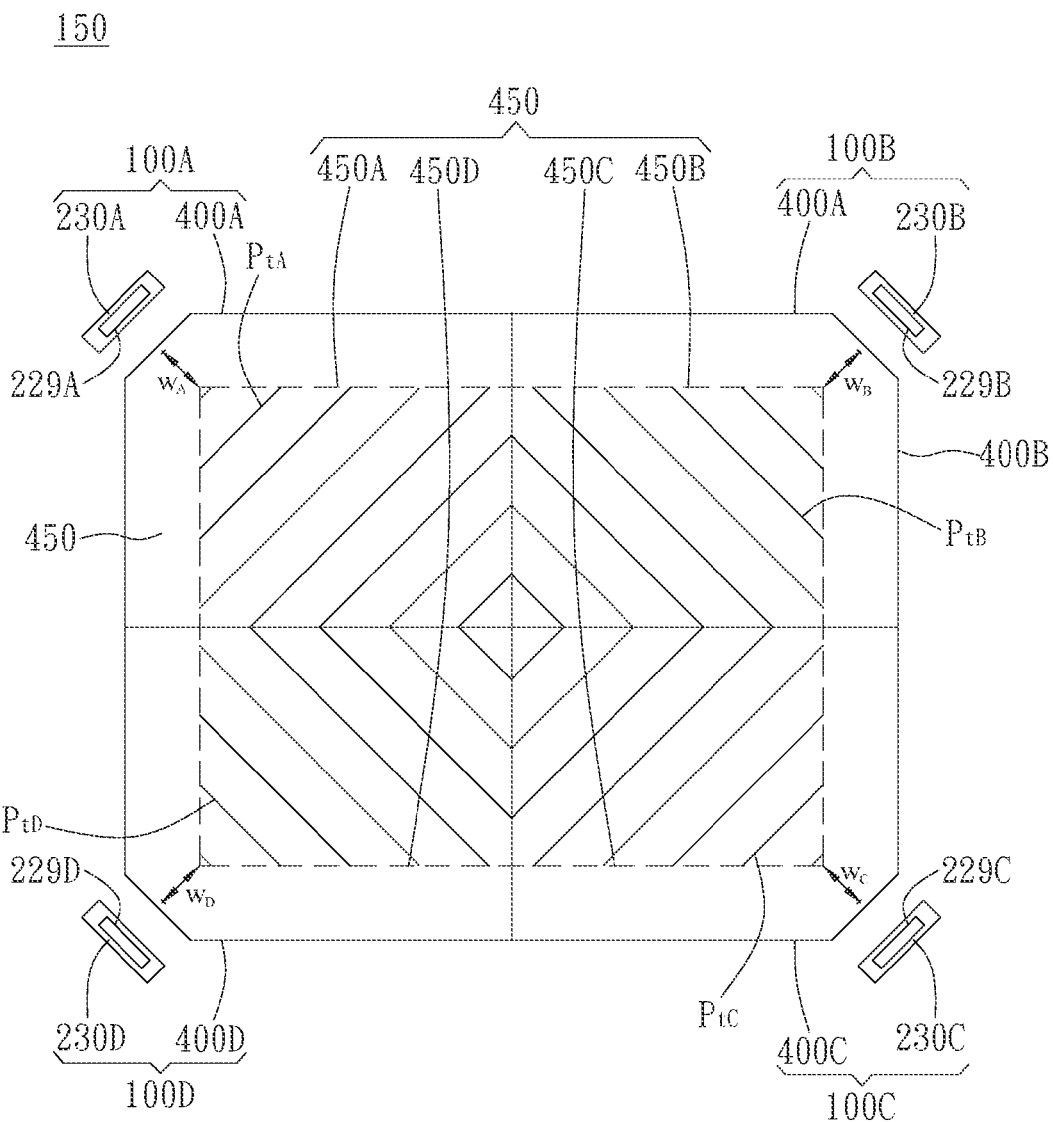
FIG. 7A is an embodiment of the display system having 4 display devices.

FIG. 7A is another embodiment of the display system 150. As shown in FIG. 7A, the display system 150 may also be formed from four display devices 100 arranged in a 2×2 matrix such that a combined display surface 450 is formed. In the present embodiment, the display system 150 includes display devices 100A, 100B, 100C, and 100D, wherein the light-entrance corners of each display device is positioned at the four corners of the combined display surface 450. In the present embodiment, the prism extending direction $P_{ta}$, $P_{tb}$, $P_{tc}$, and $P_{td}$ collectively surround a center of the display system 150 (i.e. 2×2 matrix), wherein the extending directions of the prisms at diagonal positions are symmetric with respect to the projection on the light-emitting surface. In similar fashion to the embodiment of the display device 100 of FIG. 5E, each of the display devices 100A-100D in the display system 150 will shift their respective image display areas towards the center of the display system 150. In terms of the display device 100A as an example, the position of the image display area 450A of the display device 100A will move a distance of image shift distance $W_A$ towards the center of the display system 150 (i.e. in the direction towards display device 100C). In other words, the image displayed by the display device 100A on the image display area 450A will move towards the bottom right such that the display device 100A can achieve a borderless image effect at the bottom right side on the prism film 400A. Conversely, the images produced by each of the display devices 100B, 100C, and 100D will each respectively move towards the center of the display system 150 to collectively combine with the display device 100A form the image display area 450.

In the present embodiment, the extending directions of the prisms 430 that each display device utilizes are parallel to their respective light-emitting surfaces of their light source modules, wherein the extending directions of the prism films of display devices at diagonal positions are symmetrical. For instance, in terms of the display devices 100A and 100C that are at diagonal positions, the extending direction $P_{tA}$ of the prisms 430 in display device 100A is symmetrical to the extending direction $P_{tC}$ of the display device 100C. However, in other different embodiments, the extending directions ($P_{tA}$, $P_{tB}$, $P_{tC}$, $P_{tD}$) of the prisms 430 of each display device in the display system 150 may also be arc shapes, with their respective light-entrance corners as center points, that expand towards the center of the display system 150. Through this design, crosstalk interference may be reduced in the areas closest to the 12, 3, 6, and 9 O'clock positions on the display area.

Figure 7B:
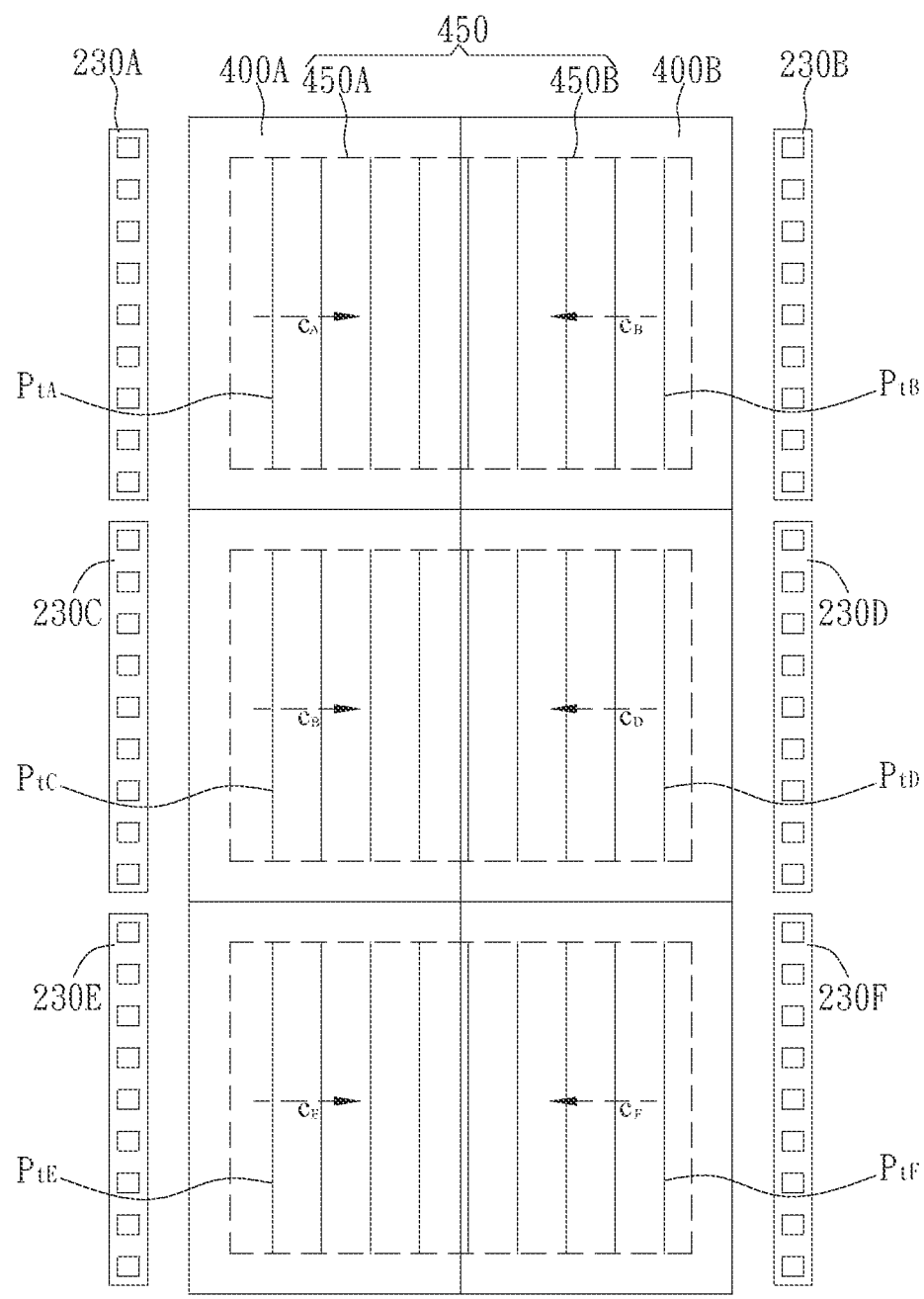
FIG. 7B is an embodiment of the display system having 6 display devices.

FIG. 7B is an embodiment of a 3×2 arrangement of display devices. As seen in FIG. 7B, the display devices of each row are disposed symmetric to each other. For instance, the display device having prism film 400A and light source module 230A is disposed symmetrically beside the display device having prism film 400B and light source module 230B. In the present embodiment, the display devices of each row will formed combined image display areas similar to the embodiment in FIG. 6B. For instance, in terms of the top row of the 3×2 arrangement of FIG. 7B, the image display area 450A of the left display device will be shifted right, while the image display area 450B of the right display device will be shifted left. In this manner, the image display area 450A and the image display area 450B will form a combined image display area 450. However, in this circumstance, although the frame borders between the symmetric display devices in each row have been visually masked, the upper and lower frame borders between rows will still be visible.

In another embodiment, the middle display devices may be combined together by utilizing the above masking of left and right frame borders. For instance, in terms of a 3×2 arrangement, the top most and bottom most display devices may utilize the frame border masking technique of FIG. 7A or 7B to mask a corner of the frame. The two symmetric display devices in the middle may utilize the masking technique in FIG. 6B to mask the frame between them, or may utilize the technique in FIG. 7B to mask a corner of their frames. However, in the present embodiment, in the upper and/or lower areas of these middle display devices, their respective frames will still be visible.

Additionally, in another embodiment of the 3×2 arrangement (not shown), the display areas of the top or the bottom row may be combined with the display area of the middle row in similar fashion to the embodiment of FIG. 7B. The remaining row may then have its display area shifted towards the combined display area.

However, in other different embodiments, the display system 150 of the present invention may also be arranged in a N×2 arrangement or N×M arrangement, wherein N and M represents positive integers. For example, when the display system 150 is in a N×2 arrangement, symmetric left and right display devices may utilize the arrangement shown in FIG. 6B.

Figure 8A:
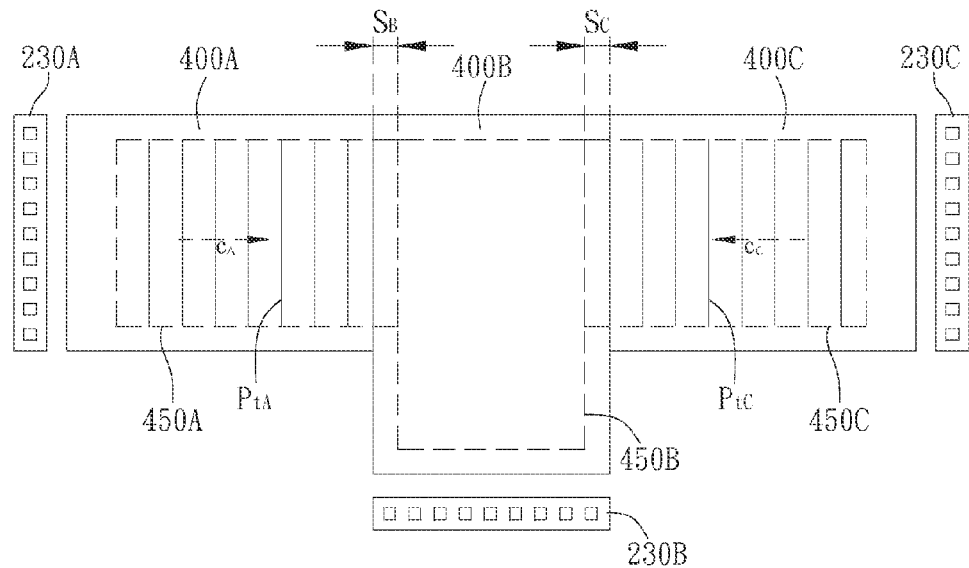
FIG. 8A is a top view of an embodiment of the display system having 3 display devices.

FIG. 8A is another embodiment of the display system, wherein the display devices of the display system are arranged in a 1×3 arrangement. As illustrated in FIG. 8A, the display device having the image display area 450A is rotated 90 degrees relative to the middle display device having the image display area 450B, wherein the light source module 230A is disposed at the side opposite the side connected to the middle display device. In similar fashion, the display device having the image display area 450C is also rotated 90 degrees, wherein the light source module 230C is disposed at the side opposite the side connected to the middle display device. In the present embodiment, the image display area 450A and the image display area 450C are shifted towards the middle display device such that they cross over into the middle display device. It should be noted that the image display area 450B of the middle display device is centered and not shifted in any direction.

Figure 8B:
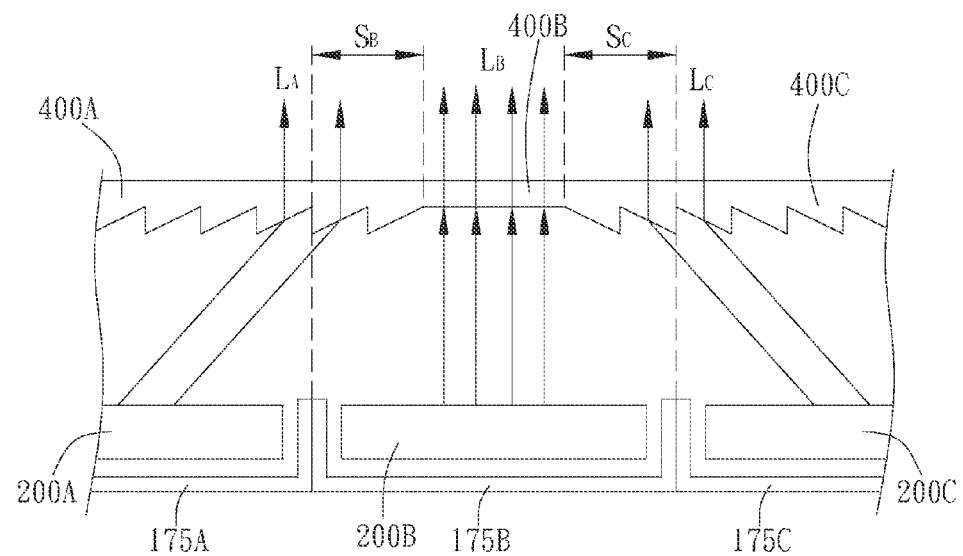
FIG. 8B is a cross-sectional view of the embodiment of FIG. 8A.

In other words, as shown in FIG. 8B of a cross-sectional view of FIG. 8A, a portion of the prism film of the middle display device corresponding to the border width $S_C$ will have prisms that will refract upwards the light $L_C$ crossing in from the display device having image display area 450C (i.e. the prisms in the portion of the prism film in border width $S_C$ will be identical to the prisms in the prism film 400C). Likewise, the prisms in the portion of the prism film within the border width $S_B$ will have prisms identical to the prisms of the prism film 400A such that light $L_A$ crossing in from the display device having the image display area 450A will be refracted upwards. In this manner, the combined image display area of the three display devices may form an extra wide viewable display, wherein neither one of the light source modules 230A-230C would need to be lengthened. Through this design, manufacturing and material costs may be reduced while providing a display system with extra wide viewing screen.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A display device, comprising:
a backlight module having a light-emitting surface and generating backlight along an average light-emitting direction that is inclined with respect to the light-emitting surface;
a display panel disposed above the light-emitting surface such that backlight from the backlight module pass through the display panel along the inclined direction; and
a prism film disposed on one side of the display panel opposite to the backlight module, wherein the prism film has a plurality of prisms disposed side-by-side on one side of the prism film facing the display panel;
wherein an extending direction of the prisms at least partially traverse across the average light-emitting direction; two sides of each prism are respectively a first surface and a second surface; the first surface and the second surface are asymmetric and projection areas of the first surface and the second surface onto the prism film do not overlap; an angle between the first surface and a normal line to the light-emitting surface is greater than an angle between the second surface and the normal line to the light-emitting surface, the angle between the second surface and the normal line to the light-emitting surface is smaller than 10 degrees, the first surface faces toward the direction of a vector component on the light-emitting surface of the average light-emitting direction relative to the second surface facing against the direction of the vector component on the light-emitting surface of the average light-emitting direction, and the prism receives the backlight at an outer surface of the prism at the first surface.

2. The display device of claim 1, wherein an angle between the first surface and the average light-emitting direction is smaller than an angle between the second surface and the average light-emitting direction.

3. The display device of claim 1, wherein the angle between the first surface and the normal line to the light-emitting surface is greater than 40 degrees.

4. The display device of claim 1, wherein the angle between the first surface and the normal line to the light-emitting surface is sufficient to refract backlight in the average light-emitting direction towards the direction parallel to the normal line of the light-emitting surface.

5. The display device of claim 1, wherein the angle between the first surface and the normal line to the light-emitting surface is greater than the angle between the average light-emitting direction and the normal line to the light-emitting surface.

6. The display device of claim 1, wherein the second surface is formed with a light blocking layer to block light.

7. The display device of claim 1, wherein the second surface is perpendicular to the light-emitting surface.

8. The display device of claim 7, wherein the width of each prism is smaller than 50 μm.

9. The display device of claim 1, wherein the width of each prism is smaller than 100 μm.

10. The display device of claim 1, wherein the backlight module further comprises a film formed of composite materials, the backlight module enables the average light-emitting direction of the backlight to be inclined to the light-emitting surface through the use of the film.

11. The display device of claim 1, wherein the backlight module comprises:
a light guide plate having a light-entrance side; and
a light source module disposed at the light-entrance side and generates light entering the light guide plate through the light-entrance side;
wherein the vector component of the average light-emitting direction on the light-emitting surface is parallel to the projection on the light-emitting surface of the light generated from the light source module entering the light guide plate.

12. The display device of claim 11, wherein the extending direction of the prisms is parallel to the light-entrance side.

13. The display device of claim 1, wherein the backlight module comprises:
a light guide plate having a light-entrance corner; and
a light source module disposed on the at least one light-entrance corner and generates light entering the light guide plate through the light-entrance corner;
wherein the direction of the projection of the light generated from the light source module entering the light guide plate onto the light-emitting surface is parallel to the vector component of the average light-emitting direction on the light-emitting surface.

14. The display device of claim 13, wherein the extending direction of the prisms is parallel to a light-emitting surface of the light source module generating the light.

15. The display device of claim 13, wherein the extending direction of the prisms forms an arc shape and spreads outward from the light-entrance corner.

16. A display system, comprising: two of the display devices of claim 1, wherein the two display devices are disposed side-by-side and the vector component on the light-emitting surface of the average light-emitting direction of each respective display device is towards the other display device.

17. A display system, comprising: four display devices of claim 13, wherein the display devices are disposed in a 2×2 matrix to form a combined display surface, and the light-entrance corner of each display device is positioned at the four corners of the combined display surface.

18. The display system of claim 17, wherein the extending direction of the prisms of the display devices collectively surrounds towards a center of the 2×2 matrix, and the extending direction of the prisms at diagonal positions are symmetric with respect to the projection of the light-emitting surface.

19. A display system, comprising: three of the display devices of claim 1, wherein the three display devices are disposed side-by-side in a series to form a combined display surface, the vector component on the light emitting surface of the average light-emitting direction of each display device that is adjacent to a middle display device of the series is towards the middle display device.

* * * * *